(12) United States Patent
Klein

(10) Patent No.: US 7,642,212 B2
(45) Date of Patent: Jan. 5, 2010

(54) HYDROCONVERSION CATALYSTS AND METHODS OF MAKING AND USING SAME

(75) Inventor: Darryl P. Klein, Ellicott City, MD (US)

(73) Assignee: Advanced Refining Technologies LLC, Columbia, MD (US)

( * ) Notice: Subject to any disclaimer, the term of this patent is extended or adjusted under 35 U.S.C. 154(b) by 0 days.

(21) Appl. No.: 12/148,068

(22) Filed: Apr. 16, 2008

(65) Prior Publication Data

US 2008/0207435 A1    Aug. 28, 2008

Related U.S. Application Data

(62) Division of application No. 10/719,551, filed on Nov. 20, 2003, now Pat. No. 7,390,766.

(51) Int. Cl.
| | |
|---|---|
| B01J 29/06 | (2006.01) |
| B01J 21/16 | (2006.01) |
| B01J 21/18 | (2006.01) |
| B01J 27/14 | (2006.01) |

(52) U.S. Cl. .............. 502/60; 502/74; 502/80; 502/84; 502/174; 502/180; 502/182; 502/185; 502/208; 502/210; 502/211; 502/213

(58) Field of Classification Search ........... 502/60, 502/74, 80, 84, 174, 180, 182, 185, 208, 502/210, 211, 213
See application file for complete search history.

(56) References Cited

U.S. PATENT DOCUMENTS

| | | | |
|---|---|---|---|
| 3,287,280 A | 11/1966 | Colgan et al. | |
| 3,755,147 A | 8/1973 | Michelson | |
| 3,755,196 A | 8/1973 | Mickelson | |
| 3,840,472 A | 10/1974 | Colgan et al. | |
| 4,202,798 A | 5/1980 | Johnson et al. | |
| 4,255,282 A | 3/1981 | Simpson | |
| 4,500,424 A | 2/1985 | Simpson et al. | |
| 4,520,128 A | 5/1985 | Morales et al. | |
| 4,588,706 A | 5/1986 | Kukes et al. | |
| 4,746,419 A | 5/1988 | Peck et al. | |
| 4,818,743 A | 4/1989 | Simpson et al. | |
| 4,940,533 A | 7/1990 | Simpson et al. | |
| 5,192,734 A | 3/1993 | Creighton et al. | |
| 5,397,956 A | 3/1995 | Araki et al. | |
| 5,498,586 A | 3/1996 | Dai et al. | |
| 5,545,602 A | 8/1996 | Nelson et al. | |
| 6,566,296 B2 | 5/2003 | Plantenga et al. | |
| 6,589,908 B1 | 7/2003 | Ginestra et al. | |

FOREIGN PATENT DOCUMENTS

| | | |
|---|---|---|
| EP | 0266008 | 5/1988 |
| EP | 0482817 | 4/1992 |
| WO | WO-9634062 | 10/1996 |

OTHER PUBLICATIONS

B. Lakhanpal et al., "Upgrading Heavy Oils With New Catalyst Technology,", Petroleum Technology Quarterly, 2004, 9, 5.

*Primary Examiner*—Elizabeth D Wood
(74) *Attorney, Agent, or Firm*—Robert A. Maggio; Harvey L. Cohen

(57) ABSTRACT

Stable catalyst carrier impregnating solutions can be prepared using a component of a Group VIB metal, e.g., molybdenum, at high concentration, a component of a Group VIII metal, e.g., nickel, at low concentration, and a phosphorous component, e.g., phosphoric acid, at a low concentration, provided that the Group VIII metal is in a substantially water-insoluble form and a particular sequence of addition of the components is followed, even when a substantially water-insoluble form of the Group VIB component is used. The resulting stabilized impregnating solution can be supplemented with additional Group VIII metal in water-soluble form to achieve increased levels of such metal in the final catalyst. Furthermore, uncalcined catalyst carriers impregnated with the stable solution and subsequently shaped, dried and calcined, have unexpectedly improved performance when used in the hydroprocessing of heavy hydrocarbon feedstocks. High conversion can be achieved at reduced levels of sediment, especially in comparison to standard commercial catalysts.

16 Claims, 3 Drawing Sheets

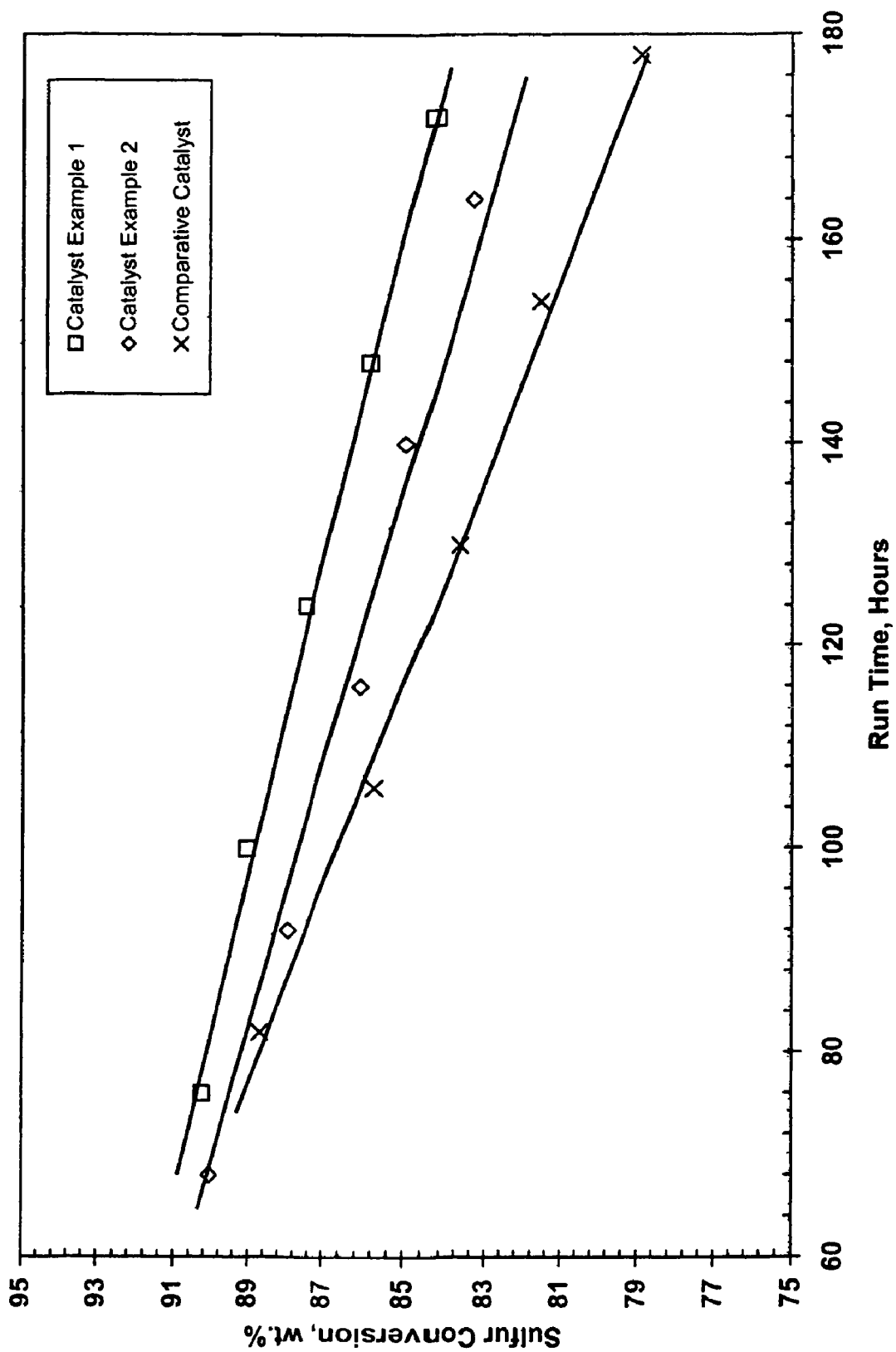

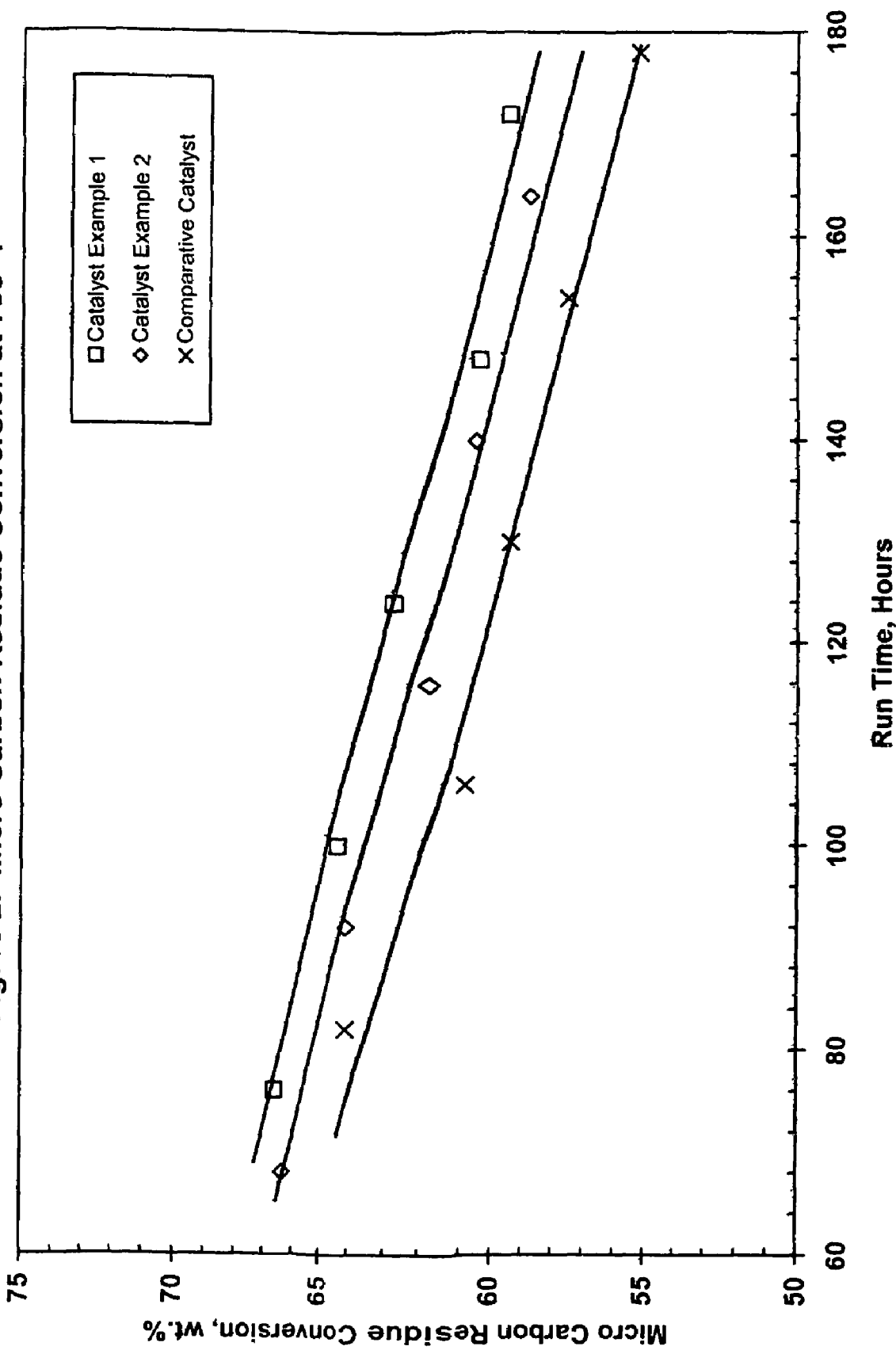
Figure 2. Micro Carbon Residue Conversion at 795 °F

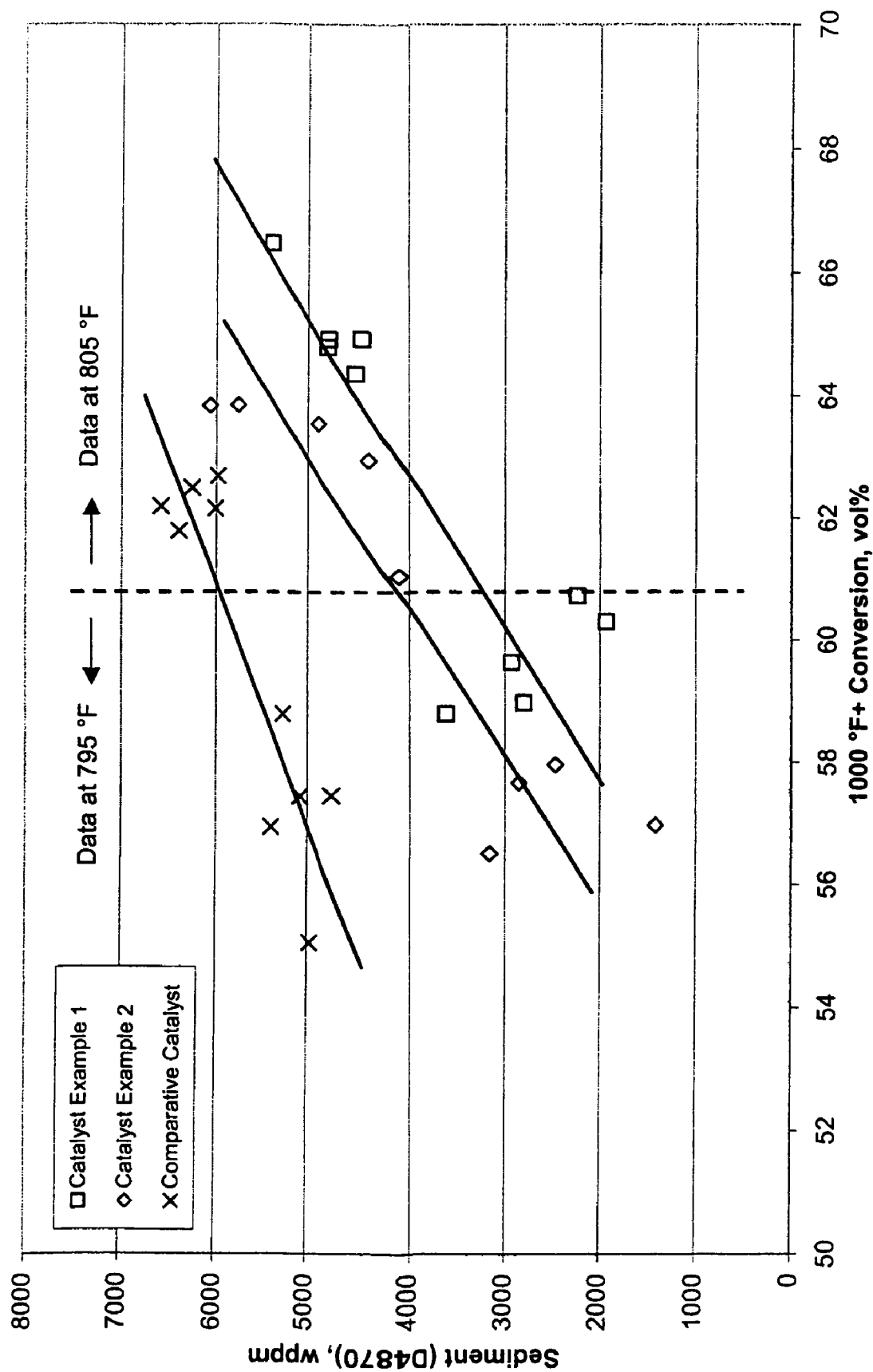
Figure 3. Sediment vs 1000 °F+ Conversion

HYDROCONVERSION CATALYSTS AND METHODS OF MAKING AND USING SAME

CROSS-REFERENCE TO RELATED APPLICATIONS

This application is a divisional of U.S. application Ser. No. 10/719,551, filed on Nov. 20, 2003, now U.S. Pat. No. 7,390,766, issued Jun. 24, 2008, the disclosure of which is incorporated herein by reference.

BACKGROUND OF THE INVENTION

This patent relates to catalysts supported on a foraminous carrier and methods for preparing such catalysts using stabilized aqueous compositions. In particular, this patent relates to aqueous compositions containing catalytically-active metal components and substantially water soluble acidic components and to the catalysts prepared using such aqueous compositions for impregnating foraminous carriers. It is desirable to convert heavy hydrocarbons, such as those having a boiling point above about 1000° F., into lighter, and more valuable, hydrocarbons. It is also desirable to treat hydrocarbon feedstocks, particularly petroleum residues, also known as resid feedstocks, in order to carry out, for example, hydrodesulfurization (HDS), hydrodenitrogenation (HDN), carbon residue reduction (CRR), hydrodemetallation (HDM), including the removal of nickel compounds (HDNi) and vanadium compounds (HDV). The catalysts of the present invention are particularly useful and effective in the hydrodesulfurization, hydrodenitrogenation, hydrodemetallation, etc. of petroleum compositions, especially high-boiling petroleum compositions.

Catalysts comprising at least one Group VIII metal component, at least one Group VIB metal component and a phosphorous component, such components being carried on a foraminous carrier, are known in the art.

It is known that the metals of Group VIB of the periodic table, for example tungsten and molybdenum, and components comprising such metals, for example compounds such as the oxides and sulfides, are active in catalyzing a wide variety of reactions including among others, hydrogenation, dehydrogenation, oxidation, desulfurization, isomerization and cracking. However, catalytic metals and components containing them are, relatively costly and have a relatively small surface area per unit weight, so that they are typically not used without resort to carrier materials. Consequently, these catalytically active metals or components are usually applied in a diluted form to the surface of a foraminous support material. The foraminous support material is usually of a low order of activity when compared to the catalytically-active components, or such carriers may even be catalytically completely inactive.

Furthermore, it is known that certain metal-containing components of Group VIII of the periodic table of the elements, such as iron, cobalt, and nickel, when used in combination with the Group VIB metal-containing components, result in enhanced catalytic activity. These Group VIII components are sometimes referred to as catalyst "promoters." However, problems can result when these promoters are attempted to be impregnated into a carrier along with the catalytically active components of Group VIB. Simple and direct impregnation techniques using a mixture of both components typically cannot be employed. For example, a combination of components based on cobalt or nickel salts with molybdenum or tungsten components typically results in unstable solutions, e.g., solutions subject to the formation of precipitates. Impregnation of a carrier using separate solutions comprising components of Group VIB and Group VIII is not an acceptable alternative since that can result in costly, multi-step processes and ineffective or non-uniform metals distribution.

Rather costly and involved processes have been devised in order to obtain a uniform distribution throughout the available surface area of the foraminous catalyst carrier material when using components containing both of the catalytically active metals of Group VIB and Group VIII. It has been the objective of these methods to prepare solutions containing metals of both Group VIB and Group VIII that are sufficiently concentrated and of the requisite stability to allow subsequent uniform impregnation and distribution of the metals throughout and upon the surface area of the carrier. These methods typically include the use of high concentrations of phosphoric acid. Typically, the carrier is impregnated with a dilute solution comprising a phosphorous component, although some applications do not use a phosphorous component, and components of metals of both Group VIB and Group VIII, by applying the solution to a calcined foraminous carrier material, and then drying and calcining the composite to convert the catalytically active material to other forms, particularly to the oxide. However, the use of phosphoric acid, particularly at high concentrations that are required to readily solubilize both of the metal containing components and maintain them in a stable solution, can introduce performance related problems during the use of such catalysts in hydroconversion processes.

Therefore, it would be an advantage to the art to prepare a stable aqueous composition containing metals from both Group VIB and Group VIII suitable for use in producing a finished catalyst having desirable performance characteristics.

Furthermore, as noted, there is increased interest in producing and upgrading lower quality hydrocarbon feeds, such as synthetic crudes and heavy petroleum crude oil fractions. Unfortunately, high concentrations of nitrogen, sulfur, metals and/or high boiling components, for example, asphaltenes and resins, in such lower quality feeds render the same poorly suited for conversion to useful products in conventional petroleum refining operations. In view of such difficulties, lower quality hydrocarbon feeds often are catalytically hydrotreated to obtain materials having greater utility in conventional downstream refining operations. Catalytic hydrotreating or hydroconversion involves contacting such a feed with hydrogen at elevated temperature and pressure in the presence of suitable catalysts. As a result of such processing, sulfur and nitrogen in the feed are converted largely to hydrogen sulfide and ammonia which are easily removed. Aromatics saturation and cracking of larger molecules often take place to convert high boiling feed components to lower boiling components. Metals content of the feed decreases as a result of deposition of metals on the hydrotreating catalyst.

As can be appreciated, satisfactory operation in processing feeds containing high levels of impurities under severe process conditions places increased demands on the catalyst to be employed as the same must exhibit not only high activity in the presence of impurities and under severe conditions, but also stability and high activity maintenance during the time that it is in use. Catalysts containing a Group VIB metal component, such as a molybdenum and/or tungsten component, promoted by a nickel and/or cobalt component and supported on a porous refractory inorganic oxide are well known and widely used in conventional hydrotreating processes; however, the same often are somewhat lacking in stability and activity maintenance under severe conditions.

It is known that preparation of hydrotreating catalysts containing Group VIB and Group VIII metal components supported on a porous refractory inorganic oxide can be improved through the use of phosphoric acid impregnating solutions of precursors to the Group VIB and Group VIII metal components or the use of phosphoric acid as an impregnation aid for the metal precursors. Thus, Pessimisis, U.S. Pat. No. 3,232,887 discloses stabilization of Group VIB and Group VIII metal-containing solutions through the use of water-soluble acids. According to the patentee, in column 3, lines 6-11, "in its broadest aspect the invention comprises the preparation of stabilized aqueous solutions which comprise an aqueous solvent having dissolved therein catalytically active compounds containing at least one element from Group VIB of the periodic table and one element from Group VIII." Inorganic oxyacids of phosphorus are included among the disclosed stabilizers, and the examples of Pessimisis illustrate preparation of various cobalt-molybdenum, nickel-molybdenum, and nickel-tungsten catalysts using phosphorus and other acids as stabilizers. Hydrodesulfurization results with certain of the cobalt-molybdenum catalysts are presented, and the patentee suggests that the use of the stabilized solutions may lead to improved hydrodesulfurization activity in some instances.

Similarly, Colgan et al., U.S. Pat. No. 3,287,280 discloses the use of phosphoric acid as an impregnation aid in preparation of nickel-molybdenum catalysts and that such use can result in catalysts having improved hydrodesulfurization activity.

Colgan et al., U.S. Pat. No. 3,840,472 disclose catalysts prepared by impregnation of an alumina support with stabilized solutions of molybdic oxide and certain cobalt or nickel salts dissolved in aqueous phosphoric acid although the patentees suggest that the presence of certain amounts of a phosphorus component in the ultimate catalyst may harm performance; see column 2, lines 23-28.

Simpson, U.S. Pat. No. 4,255,282 discloses hydrotreating catalysts comprising molybdenum, nickel, and phosphorus components and a gamma-alumina support, such catalysts being prepared by a method that involves a precalcination of the gamma-alumina at a temperature greater than 746° C. With respect to the phosphorus component, Simpson teaches that the same often has been included in hydrotreating catalysts to increase catalyst acidity and thereby improve activity.

While the patents and publication discussed above disclose that the use of phosphoric acid in the preparation of hydrotreating catalysts containing Group VIB and Group VIII metal components is beneficial to the preparations, reported effects on catalytic activity and performance vary significantly. For example, the general statement in Simpson, U.S. Pat. No. 4,255,282 regarding use of a phosphorus component to increase acidity and thereby improve activity, is contrary to the teaching of Colgan, U.S. Pat. No. 3,840,472 that use of phosphoric acid in improper amounts can adversely affect catalyst activity and strength.

Other patents relating to hydroconversion or hydrotreating processes disclose various catalysts, their method of preparation as well as their use in such processes. For example, Simpson et al., U.S. Pat. No. 4,500,424 and its divisional patent, U.S. Pat. No. 4,818,743 are directed to hydrocarbon conversion catalysts containing at least one Group VIB metal component, at least one Group VIII metal component, and a phosphorus component on a porous refractory oxide having a defined and narrow pore size distribution. The catalyst is said to be useful for promoting various hydrocarbon conversion reactions, particularly hydrodesulfurization. Similarly, Nelson et al., U.S. Pat. No. 5,545,602 is directed to hydrotreatment of heavy hydrocarbons to increase content of components boiling below 1000° F. by contact with Group VIII non-noble metal oxide and Group VIB metal oxide on alumina having specific and defined surface area and pore size distribution. This patent also teaches, at column 9, lines 36-37, to avoid adding phosphorous containing components during catalyst preparation because "Presence of phosphorous undesirably contributes to sediment formation." In furtherance of this teaching it is suggested, at lines 54-57, that impregnating solutions may be stabilized with $H_2O_2$ so that solutions stabilized with $H_3PO_4$ not be used. See also Dai et al., U.S. Pat. Nos. 5,397,956 and 5,498,586 similarly directed to defined carrier properties for improved hydroconversion catalysts.

Plantenga, et al., U.S. Pat. No. 6,566,296 relates to a process for preparing a catalyst composition wherein at least one Group VIII non-noble metal component and at least two Group VIB metal components are combined and reacted in the presence of a protic liquid, e.g., water, and an organic oxygen-containing additive, e.g., diethyleneglycol, is added. The resulting composition is isolated and dried, and, while calcining is an option that results in removal of the oxygen-containing additive, the examples are directed to dried and crushed catalyst particles.

Notwithstanding the diverse teachings of the above patents and publication in respect of the preparation of hydrotreating catalysts, there is a continuing need for development of improved catalysts.

SUMMARY OF THE INVENTION

It has been discovered that stable catalyst carrier impregnating solutions can be prepared using a component of a Group VIB metal, e.g., molybdenum, at high concentration, a component of a Group VIII metal, e.g., nickel, at low concentration, and a phosphorous component, e.g., phosphoric acid, at low concentration, provided that the Group VIII metal is in a substantially water-insoluble form and a particular sequence of addition of the components is followed, even when a substantially water-insoluble form of the Group VIB component is used. The resulting stabilized impregnating solution can be supplemented with additional Group VIII metal in water-soluble form to achieve increased levels of such metal in the final catalyst. Furthermore, it has been discovered that uncalcined catalyst carriers impregnated with the stable solution and subsequently shaped, dried and calcined, have unexpectedly improved performance when used in hydrocarbon conversion processes, especially in the hydrodesulfurization, hydrodemetallation, hydrodenitrification and hydroconversion of heavy hydrocarbons. The catalyst is particularly useful in hydroconversion processes using heavy hydrocarbon feedstocks in which high conversion can be achieved at reduced levels of sediment, especially in comparison to standard commercial catalysts.

Accordingly, one aspect of the invention is a stabilized composition for use in impregnating catalyst carriers comprising: (A) water; (B) catalytically active metals being in the form of and comprising: (1) at least one component providing at least one metal from Group VIB of the periodic table; and (2) at least one component providing at least one metal from Group VIII of the periodic table; wherein (i) the Group VIII metal is provided by a substantially water insoluble component; (ii) the molar ratio of the Group VIII metal to Group VIB metal is about 0.05 to about 0.45, provided that the amount of the Group VIII metal is sufficient to promote the catalytic effect of the Group VIB metal; (iii) the concentration of the Group VIB metal, expressed as the oxide, is at least about 3 to about 50 weight percent based on the weight of the composition; and (C) at least one substantially water-soluble, phosphorous-containing acidic component in an amount sufficient to provide a phosphorous to Group VIB metal molar ratio of about 0.05 to less than about 0.25.

Another aspect of the invention is a composition for use in preparing a catalytically active solid, the composition comprising: (A) water in a quantity sufficient to provide a shaped foraminous catalyst mixture; (B) catalytically active metals useful in chemically refining hydrocarbons, the metals in the form of at least one component providing at least one metal from Group VIB of the periodic table and at least one component providing at least one metal from Group VIII of the periodic table, wherein the molar ratio of the Group VIII metal to Group VIB metal is about 0.05 to about 0.45, and wherein the Group VIII metal component is provided by a substantially water insoluble component; and (C) at least one substantially water-soluble phosphorous-containing acidic component in an amount sufficient to provide a phosphorous to Group VIB molar ratio of about 0.05 to about 0.25; and (D) at least one uncalcined foraminous catalyst carrier.

A further aspect of the invention is a method of preparing stabilized aqueous compositions for use in impregnating catalyst carriers to produce catalyst precursors and catalysts comprising adding to a suitable quantity of water: (A) at least one substantially water insoluble Group VIII metal component; and (B) at least one substantially water soluble, phosphorous-containing acidic component in an amount insufficient to cause dissolution of the Group VIII metal component so as to produce a slurry, and combining the slurry with: (C) at least one Group VIB metal component; and (D) mixing the combination of (A), (B) and (C) and heating the mixture, for a time and to a temperature sufficient for (A), (B) and (C) to form a solution; and (E) adding an additional amount of water, if required, to obtain solution concentrations of the at least one Group VIII metal, the at least one Group VIB metal and phosphorous useful for impregnating the carriers; wherein Group VIB and Group VIII refer to Groups of the periodic table of the elements.

A still further aspect of the invention is a catalyst prepared by impregnation of a catalyst carrier with a stabilized aqueous composition as described above and including the step of separating the volatile portion of the solution from the impregnated uncalcined carrier to obtain a dried composition having a desired moisture content and calcining the dried composition.

Another aspect of the invention is a catalyst useful in chemically refining hydrocarbons, the catalyst comprising at least one catalytically active metal from Group VIB of the periodic table, at least one catalytically active metal from Group VIII of the periodic table, and phosphorous, wherein the metals and phosphorous are carried on a foraminous carrier, wherein the pore mode is typically about 40 to about 90 Å, wherein the loss in weight on ignition at 1000° F. to 1200° F. of the catalyst is less than about 5 wt. based on the weight of the catalyst, and wherein the ASI ratio is greater than about 0.75 to about 2.0. The catalyst is particularly useful in hydroconversion processes using heavy hydrocarbon feedstocks in which high conversion can be achieved at reduced levels of sediment, especially in comparison to standard commercial catalysts.

BRIEF DESCRIPTION OF THE DRAWINGS

FIG. 1 illustrates the performance of catalysts prepared according to the invention in terms of sulfur conversion.

FIG. 2 illustrates the performance of catalysts prepared according to the invention in terms of microcarbon residue conversion.

FIG. 3 illustrates the performance of catalysts prepared according to the invention in terms of sediment vs. 1000 F+ conversion.

DETAILED DESCRIPTION OF THE INVENTION

For purposes of the present specification, the following words and phrases shall have the following meanings:

The word "component" with regard to the metals and phosphorous of the impregnating solution and catalyst refers to any compound or complex, including a salt, oxide, sulfide, or any intermediate form between oxide and sulfide of the metal or phosphorous in question.

All references herein to elements or metals belong to a certain Group refer to the Periodic Table of the Elements and Hawley's Condensed Chemical Dictionary, $13^{th}$ Edition. Also, any references to the Group or Groups shall be to the Group or Groups as reflected in this Periodic Table of Elements using the CAS system for numbering groups.

For purposes of the present invention, the terms "pre-impregnated" and "post-impregnated" (and the equivalent terms, "pre-calcined" and "post-calcined") are used in connection with the catalysts of the present invention.

"Pre-impregnated" catalyst refers to a catalyst in which the metals-containing solution or solutions are added before the foraminous catalyst carrier is calcined. The metals-containing solution or solutions can be added prior to or after shaping of the catalyst particle, but the important aspect is that the metals-containing solution or solutions be added prior to the carrier material being calcined. However there are significant advantages to be gained by shaping of the uncalcined carrier after impregnation (contact) with the aqueous solution of the present invention. These advantages are observed in the form of more desirable distribution of the metals throughout the carrier in the final catalyst. Thus, a "pre-impregnated" catalyst can be made as follows:

Uncalcined pseudoboehmite alumina powder is thoroughly mixed with water, or optionally with a dilute aqueous solution of nitric acid, and the mixture is combined with a suitable quantity of a stable metals solution of the present invention as described in detail hereinbelow. For example, such solution typically contains molybdenum, nickel and phosphorus, plus an optional additional quantity of Group VIII metals solution, if required in order to provide the desired amount of metals on the finished catalyst. Note that the identity of the Group VIII metal component employed to achieve the optional additional quantity of the Group VIII metal is typically selected to be water-soluble under the temperature conditions encountered.

The metal-containing mixture, typically containing about 50 to about 65 weight percent moisture, is shaped into catalyst particles having a desired size, preferably by extrusion. The formed catalyst particles are dried at a temperature of about 110 to about 150° C., and then calcined at a temperature of about 500 to about 750° C. for about one to about two hours.

"Post-impregnated" catalyst refers to a catalyst in which the metals-containing solution or solutions are added after the foraminous catalyst carrier is calcined. The foraminous catalyst carrier can be calcined before or after shaping of the catalyst particle, but the important aspect is that the metals-containing solution or solutions be added after the carrier material is calcined. Thus, a "post-impregnated" catalyst can be made as follows:

Uncalcined pseudoboehmite alumina powder is thoroughly mixed with water, or optionally with a dilute aqueous solution of nitric acid, and the alumina mixture, containing about 50 to 65 weight percent moisture, is then formed into catalyst particles having a desired size and shape, preferably by extrusion. The formed particles are dried at a temperature of about 110 to about 150° C., and then calcined at a temperature of about 400 to about 750° C. for about one to two hours. The dried and calcined particles are contacted with a suitable quantity of a stable metals solution of the present invention as described in detail hereinbelow. For example, such solution typically contains molybdenum, nickel and phosphorus, plus an optional additional quantity of Group VIII metals solution, if required, in order to provide the desired amount of metals on the finished catalyst, while substantially and uniformly filling the pores. After a suitable contact time, the formed catalyst particles are dried at a temperature of about 110 to about 150° C., and then calcined at a temperature of about 400 to about 750° C. for about one to about two hours.

It will be observed that a significant distinction between a pre-impregnated catalyst and a post-impregnated catalyst is that the post-impregnated catalyst undergoes two calcining steps; typically one consisting essentially of the foraminous carrier and the second in which the carrier has been "loaded" with the catalytically active metal components including the phosphorous component. In contrast, the pre-impregnated catalyst undergoes one calcining step, as described.

"Substantially" as applied to any criteria, such as a property, characteristic or variable, means to meet the stated criteria in such measure such that one skilled in the art would understand that the benefit to be achieved or condition desired is met. Further, more specific definitions may be found herein as the term applies to specific features of the invention.

Suitable catalytically active elements or metals from Group VIII of the periodic table present in components of the invention may include Fe, Co, Ni, Pd, Pt and the like and mixtures thereof. Of these, the most preferable are Co and Ni. Suitable Group VIB elements or metals include Cr, Mo, W, and mixtures thereof; most preferred are Mo and W. Preferred combinations of metal components comprise e.g., nickel and molybdenum, cobalt and molybdenum, tungsten and nickel or cobalt, molybdenum and a combination of cobalt and nickel, tungsten and a combination of nickel and cobalt, a combination of molybdenum and chromium and nickel, etc; the combination of molybdenum and nickel is particularly preferred.

The overall process for preparing the stable impregnating solution of the invention and some of the advantages accruing from the process can be described as follows:

An amount of a substantially water-insoluble Group VIII metal component is added to water to form a slurry. The amount of the Group VIII metal component is low relative to the amount of the Group VIB metal component that will be added in a subsequent step. The specific amount of the substantially water-insoluble Group VIII metal component can be characterized by the molar ratio of the Group VIII metal to the Group VIB metal in the final impregnating solution; typically, the molar ratio is from about 0.05 to about 0.45; other suitable ranges of this variable and others are described below.

To the aqueous slurry of the substantially water-insoluble Group VIII metal component just described, is added an aqueous solution of a water-soluble, phosphorus-containing acidic component. The amount of this acidic phosphorus component is low relative to the amount of the Group VIB metal component that will be added in a subsequent step, and is at a level insufficient to cause the Group VIII metal component to become substantially soluble at this stage of the process, although it is believed that the components added in these steps 1 and 2 undergo reaction. In any event, a slurry of the components is maintained at this stage. The specific amount of the water-soluble, phosphorus-containing acidic component can be characterized by the molar ratio of phosphorus to the Group VIB metal in the final impregnating solution; typically this molar ratio is from about 0.05 to less than 0.25.

To the aqueous slurry present at the end of step 2, is added the Group VIB metal component. The resulting slurry mixture is heated for a time and to a temperature sufficient for the Group VIB metal component to react with the aqueous slurry produced by the substantially water-insoluble Group VIII metal component and the water-soluble, phosphorus-containing acidic component, and to form a solution. Generally, mixing and heating may be carried out over a period of about 1 to about 8 hours and at a temperature of about 160 to about 200° F.

The concentration of the Group VIB metal component in the impregnating solution composition can be quite high, up to about 50 weight percent, expressed as the oxide, and based on the total weight of the impregnating solution composition. It should be obvious to those skilled in the art that more dilute solutions, useful for particular applications, can be obtained by diluting the concentrated composition with a suitable amount of water.

Additional Group VIII metal, in the form of a substantially water-soluble Group VIII metal component, can be added to the compositions in step 4 as required to give the desired level of Group VIII metal component and the desired ratio of Group VIII metal component to Group VIB metal component in the finished catalyst. The ratio of Group VIII metal component to Group VIB metal component can thus be varied from about 0.05 to about 1.0.

The catalyst impregnating compositions produced by the method described, allow for high concentrations of the Group VIB metal component at low relative concentrations of both the phosphorus and Group VIII metal components. The low relative concentration of the phosphorus component can be advantageous for the preparation of catalysts that can benefit from or tolerate a low level of phosphorus. Additionally, this catalyst impregnating solution is surprisingly stable, i.e., it can be stored for extended periods as a solution without the formation of precipitates.

The low relative concentration of the Group VIII metal component is advantageous for several reasons. First, the compositions allow for the preparation of catalysts with a wide range of ratios of Group VIII metal component to Group VIB metal component. Second, a substantial amount of the Group VIII metal component required for the finished catalyst can be added in the form of a substantially water-soluble Group VIII metal component that might otherwise be difficult to solubilize in the presence of a large amount of Group VIB metal component unless a significantly larger amount of the acidic phosphorous component was used. These substantially water-soluble Group VIII metal components, especially the salts of mineral acids (e.g., nitrates), can be more cost-effective than the substantially water-insoluble Group VIII metal component salts (e.g., carbonates). Third, as will be described and exemplified, the impregnating solution of the present invention can be used to produce a hydroconversion catalyst having excellent performance characteristics.

Suitable Group VIII metal components for use in the invention which are characterized herein as substantially insoluble in water include the citrates, oxalates, carbonates, hydroxycarbonates, hydroxides, phosphates, phosphides, sulfides, aluminates, molybdates, tungstates, oxides, or mixtures thereof. Oxalates, citrates, carbonates, hydroxy-carbonates, hydroxides, phosphates, molybdates, tungstates, oxides, or mixtures thereof are preferred; most preferred are hydroxy-carbonates and carbonates. Generally, the molar ratio between the hydroxy groups and the carbonate groups in the hydroxy-carbonate is in the range of about 0-4; preferably about 0-2; more preferably about 0-1; and most preferably about 0.1-0.8. In particular, suitable substantially water insoluble components providing a Group VIII metal are the carbonates and hydroxides of nickel and cobalt.

Suitable substantially water-soluble components providing a Group VIII metal for use in the invention include salts, such as nitrates, hydrated nitrates, chlorides, hydrated chlorides, sulfates, hydrated sulfates, formates, acetates, or hypophosphite. Suitable substantially water-soluble nickel and cobalt components include nitrates, sulfates, acetates, chlorides, formates or mixtures thereof, as well as nickel hypophosphite. Suitable water-soluble iron components include iron acetate, chloride, formate, nitrate, sulfate or mixtures thereof. In particular, substantially water-soluble components are salts such as nickel and cobalt nitrates, sulfates, and acetates.

An indicator of the relative solubility of the substantially insoluble and soluble components, can be found by comparing nickel carbonate to nickel nitrate or nickel sulfate. As reported in the CRC Handbook of Chemistry and Physics, $69^{th}$ Ed., 1988-9 (R. C. Weast, Ed., CRC Press), nickel carbonate has a solubility of about 0.009 g/100 mL of water whereas nickel nitrate has a solubility of about 239 g/100 mL and nickel sulfate a solubility of about 29-76 g/100 mL, depending on the water of hydration of the particular salt. Furthermore, the solubility of the sulfate salts increases to about 87-476 g/100 mL in hot water. Consequently, one skilled in the art will understand the reference to "substantial" with regard to water solubility of these components. Alternatively, for purposes of the present invention, the aqueous solubility of a substantially water insoluble Group VIII metal component is generally less than 0.05 moles/100 mL (at 18° C.); conversely, the solubility of a substantially water-soluble component is greater than 0.05 moles/100 mL, e.g., greater than about 0.10 moles/100 mL (at 18° C.).

Suitable components providing a Group VIB metal include both substantially water-soluble and substantially water insoluble components. Suitable substantially water-soluble Group VIB metal components include Group VIB metal salts such as ammonium or alkali metal monomolybdates and tungstates as well as water-soluble isopoly-compounds of molybdenum and tungsten, such as metatungstic acid, or water-soluble heteropoly compounds of molybdenum or tungsten comprising further, e.g., P, Si, Ni, or Co or combinations thereof. Suitable substantially water-soluble isopoly- and heteropoly compounds are given in Molybdenum Chemicals, Chemical data series, Bulletin Cdb-14, February 1969 and in Molybdenum Chemicals, Chemical data series, Bulletin Cdb-12a-revised, November 1969. Suitable substantially water-soluble chromium compounds include chromates, isopolychromates and ammonium chromium sulfate. Suitable Group VIB metal components that are substantially water insoluble, e.g., having a low solubility in water, include di- and trioxides, carbides, nitrides, aluminium salts, acids, sulfides, or mixtures thereof. Preferred substantially insoluble Group VIB metal components are di- and trioxides, acids, and mixtures thereof. Suitable molybdenum components include molybdenum di- and trioxide, molybdenum sulfide, molybdenum carbide, molybdenum nitride, aluminium molybdate, molybdic acids (e.g. $H_2MoO_4$), ammonium phosphomolybdate, or mixtures thereof; molybdic acid and molybdenum di- and trioxide are preferred. Suitable substantially insoluble tungsten components include tungsten di- and trioxide, tungsten sulfide ($WS_2$ and $WS_3$), tungsten carbide, orthotungstic acid ($H_2WO_4 \cdot H_2O$), tungsten nitride, aluminium tungstate (also meta- or polytungstate), ammonium phosphotungstate, or mixtures thereof; orthotungstic acid and tungsten di- and trioxide are preferred. Most preferred is molybdenum trioxide, $MoO_3$. For purposes of the present invention, the aqueous solubility of a substantially water insoluble Group VIB metal component is generally less than 0.05 moles/100 mL (at 18° C.); conversely, the solubility of a substantially water-soluble component is greater than 0.05 moles/100 mL, e.g., greater than about 0.10 moles/100 mL., the oxides such as molybdenum trioxide, molybdenum blue, also identified as molybdenum pentoxide, tungstic oxide, etc.; the acids, e.g., molybdic, tungstic and chromic acids; metal salts such as the ammonium, alkali and alkaline earth metals, e.g., ammonium heptamolybdate, ammonium phosphomolybdate, ammonium paratungstate; and the complex salts of Group VIB and Group VIII metals such as complex cobalt and nickel phosphomolybdates.

The phosphorous-containing acidic component is substantially water soluble, preferably a water soluble, acidic component that may be an oxygenated inorganic phosphorus-containing acid such as phosphoric acid although any one or more of the phosphoric acids may be used, including orthophosphoric acid, metaphosphoric acid, pyrophosphoric acid, triphosphoric acid and tetraphosphoric acid and mixtures thereof. For the purposes of the invention, substantial phosphorous water solubility means sufficient solubility to react with the substantially water-insoluble Group VIII metal component. Additionally, a soluble salt of phosphoric acid, such as the ammonium phosphates may also be used. Phosphoric acid may be added to the solution in liquid or solid form. A preferred compound is orthophosphoric acid ($H_3PO_4$) in a highly concentrated aqueous solution, although any suitable form of phosphoric acid or precursor thereof, e.g., phosphorus pentoxide ($P_2O_5$) may be utilized. Naturally, concentrated acid may be appropriately diluted for use or an appropriate form of dilute acid may be used directly.

Should it be desired to supplement the composition with an acid, e.g., in order to adjust the pH, other suitable, water-soluble acids can be used, such as a hydroxy monocarboxylic acid, a polyhydroxy monocarboxylic acid, a hydroxy polycarboxylic acid, a polyhydroxy polycarboxylic acid, a monocarboxylic acid, etc.

The catalyst composition typically comprises about 5 to about 35 wt. % of the total of Group VIB and Group VIII metal components, calculated as oxides based on the total weight of the catalyst composition; preferably, about 8 to about 30 wt. %, more preferably about 10 to about 25 wt. %. The amount of Group VIB metals and Group VIII metals can be determined using atomic absorption spectrometry (AAS), inductively-coupled plasmaspectrometer (ICP) analysis and/or x-ray fluorescence (XRF).

Examples of suitable foraminous carrier materials include silica, silica gel, silica-alumina, alumina, titania, titania-alumina, zirconia, boria, terrana, kaolin, magnesium silicate, magnesium carbonate, magnesium oxide, aluminum oxide, precipitated aluminum oxide, activated alumina, bauxite, kieselguhr, pumice, natural clays, synthetic clays, cationic clays or anionic clays such as saponite, bentonite, kaolin, sepiolite or hydrotalcite, and mixtures thereof. Preferred foraminous carrier components are silica, silica-alumina, alumina, titania, titania-alumina, zirconia, bentonite, boria, and mixtures thereof; silica, silica-alumina, and alumina are especially preferred. Alumina can be prepared, e.g., by converting an alumina precursor such as boehmite, into a preferred carrier material gamma-alumina.

Preferably, the catalyst composition following impregnation, drying and calcinations, i.e., wherein the metal components and phosphorus are present as oxides, and, preferably, prior to a sulfidation step, if any, has a BET surface area typically about 225 $m^2/g$ to about 500 $m^2/g$; preferably about 250 $m^2/g$ to about 400 $m^2/g$; more preferably about 250 $m^2/g$ to about 350 $m^2/g$; most preferably about 250 $m^2/g$ to about 330 $m^2/g$; as measured using either of two tests according to the Brunauer, Emmett and Teller (BET) method: ASTM D3663, a multipoint test or ASTM D4567, a single point test. The pore mode diameter by volume (dV/dD max) of the calcined catalyst composition, i.e., metals present as oxides, is typically about 40 to about 90 Å; preferably about 45 to about 80 Å (by the mercury porosimetry method, ASTM D4284 Standard Test Method for Determining Pore Volume Distribution of Catalysts by Mercury Intrusion Porosimetry; using a contact angle of 130° and surface tension of 484 dynes/cm). The total pore volume, also referred to as the total intrusion volume (TIV), of the calcined catalyst composition is typically at least about 0.50 cc/g; preferably about 0.50 to about 2 cc/g; more preferably about 0.7-1.5 cc/g, as determined by mercury porosimetry (also using ASTM D4284).

The term "agglomerate" refers to a product that combines particles that are held together by a variety of physical-chemical forces and the term "shaping" and grammatical variations thereof refers to the act of forming agglomerates. More specifically, each agglomerate is composed of a plurality of contiguous, constituent primary particles, preferably joined and connected at their points of contact. Thus, the agglomerates particles typically exhibit a higher macropore content than the constituent primary particles from which they are made because of the interparticle voids between the constituent composite particles.

Agglomeration of the foraminous carrier, e.g., alumina, composite is carried out in accordance with methods well known to the art, and, in particular, by such methods as pelletizing, extrusion, shaping into beads in a rotating coating drum, and the like. The modulizing technique whereby composite particles having a diameter of not greater than about 0.1 mm are agglomerated to particles with a diameter of at least about 1 mm by means of a granulation liquid may also be employed. As is known to those skilled in the art, agglomeration may optionally be carried out in the presence of additional amorphous or crystalline binders, and pore-forming agents may be added to the mixture to be agglomerated. Conventional binders include other forms of alumina, silica, silica-alumina, clays, zirconia, silica-zirconia, magnesia and silica-boria. Conventional pore-forming agents which can be used in particular, include wood flour, wood charcoal, cellulose, starches, naphthalene and, in general, all organic compounds capable of being removed by calcination. The addition of pore forming agents, however, is not necessary or desirable.

The catalyst composition may have different shapes selected for their suitability for the process and/or equipment in which they are to be used. For example, if the catalyst composition is to be used in slurry-type reactors, fluidized beds, moving beds, or expanded beds, generally spray-drying or beading is applied. For fixed bed or ebullating bed applications, generally the catalyst composition is extruded, pelletized and/or beaded. In the latter case, at any stage prior to or during the shaping step, any additives, which are conventionally used to facilitate shaping, can be added. These additives may comprise aluminium stearate, surfactants, graphite, starch, methyl cellulose, bentonite, polyethylene glycols, polyethylene oxides or mixtures thereof. Further, as discussed elsewhere, when alumina is used as the carrier, nitric acid is sometimes added prior to the shaping step for the purpose of, e.g., increasing the mechanical strength of the agglomerates. In the present invention the shaping step is carried out in the presence of water. For extrusion and beading, the amount of water in the shaping mixture, expressed as LOI, preferably is in the range of 20-80%. If required by the shaping operation, additional water can be added or, if the amount of water is too high, it can be reduced by, e.g., solid-liquid separation via, e.g., filtration, decantation, or evaporation. It is within the scope of the skilled person to control the amount of water appropriately.

Suitable shapes include powders, spheres, cylinders, rings, and symmetric or asymmetric polylobal forms, for instance tri- and quadrulobal. Particles resulting from extrusion, beading or pelleting usually have a diameter in the range of about 0.2 to about 10 mm, and lengths in the range of about 0.5 to about 20 mm, but deviations from these general ranges are possible Catalysts in the form of extrudates are generally preferred.

The present invention is also directed to catalyst compositions according to the invention wherein the metal components have been converted partly or wholly into their sulfides. In that case, it is preferred for the catalyst to be essentially free from Group VIII metal disulfides.

Calcination is generally carried out at a temperature typically about 200 to about 850° C.; preferably about 350 to about 800° C.; more preferably about 450 to about 750° C. The calcination time generally varies from about 0.5 to about 48 hours. The calcination may be carried out in an inert gas such as nitrogen, or in an oxygen-containing gas, such as air or pure oxygen, and optionally in the presence of steam. Preferably, the calcination is carried out in an oxygen-containing atmosphere.

Embodiments of the present invention include:

(I) A stabilized composition adapted for use in impregnating catalyst carriers comprising: (A) water; (B) catalytically active metals being in the form of and comprising: (1) at least one component providing at least one metal from Group VIB of the periodic table; and (2) at least one component providing at least one metal from Group VIII of the periodic table; wherein (i) the Group VIII metal is provided by a substantially water insoluble component; (ii) the molar ratio of the Group VIII metal to Group VIB metal is about 0.05 to about 0.45, provided that the amount of the Group VIII metal is sufficient to promote the catalytic effect of the Group VIB metal; and (iii) the concentration of the Group VIB metal, expressed as the oxide, is at least about 3 to about 50 weight percent based on the weight of the composition; and (C) at least one water soluble, phosphorous-containing acidic component in an amount sufficient to provide a phosphorous to Group VIB metal molar ratio of about 0.05 to less than about 0.25. If it is desired to prepare a low metal concentration catalyst, the stabilized aqueous impregnating composition can have a relatively dilute concentration of the Group VIB metal, for example, from about 3 to about 6 weight percent; for example, about 3.5 to about 5.5 weight percent. In contrast, where a higher metal content catalyst is desired, the impregnating composition can contain about 25 to about 50 weight percent of the Group VIB metal; for example, about 26 to about 46 weight percent; or about 28 to about 42 weight percent. Other useful compositions are found within the range of about 3 to about 50 weight percent of the Group VIB metal including, for example, 7-27, 8-26, 10-24 as well as concentrations in the range of about 12 to about 48 weight percent;

for example about 13 to about 40 weight percent. Useful molar ratios of the Group VIII metal to Group VIB metal are about 0.05 to about 0.40; or about 0.05 to about 0.30; for example, about 0.10 to about 0.25. Furthermore, the molar ratio of phosphorus to Group VIB metal can be about 0.07 to about 0.23; or about 0.08 to about 0.20; for example, about 0.09 to about 0.18.

The impregnating solution prepared in the sequence described in detail below is surprisingly stable and can be stored for an extended period of time until needed to prepare the catalyst. The composition can be stable for periods in excess of hours, days and weeks, even periods in excess of a month or more.

Where a catalyst is desired having a higher concentration of Group VIII metal, e.g., nickel, the aqueous impregnating solution can be supplemented with a nickel component in soluble form. In that case, the total amount of Group VIII metal is increased and the molar ratio of Group VIII metal to Group VIB metal can typically range from about 0.05 to about 1.0; preferably about 0.05 to about 0.9; more preferably about 0.05 to about 0.7. As will be later described, the additional, soluble Group VIII metal component can be included in the aqueous impregnating solution or, preferably, added as an aqueous solution to the combination of foraminous carrier and impregnating composition described above.

The stable aqueous impregnating solution described in (I) above can be employed in a process for preparing the catalyst of the present invention as follows: A mixture is prepared using the impregnating solution of (I), a quantity of additional Group VIII metal component in soluble form where the catalyst is to contain a higher level of the Group VIII metal than is available in (I) and a foraminous powder. It should be appreciated that alternative variations are also feasible. For example, the soluble Group VIII metal component could be combined with (I) to provide the total amount of such metal required and that mixture could constitute one feed component. Alternatively, the foraminous carrier could be combined with the soluble Group VIII metal component and that mixture could be combined with (I) in the desired quantity. Alternative convenient arrangements will be apparent to a person skilled in the art. The just-described components are fed to a mixer, for example, a short residence time, low energy mixer or a higher energy mixing device in order to combine these components. Optionally, additional water can be included in order to obtain a "damp mix." Such a mixture is understood to have sufficient moisture to provide a composition that is capable of holding its shape after being extruded or compressed into the desired shape. In other words, if the mixture contains an excessive amount of water it will be resemble a slurry and if too little water, it will tend to crumble and be incapable of holding its shape. Optionally, and particularly where a low energy mixing device is used, the additional water added to the mixer can contain a small quantity of nitric acid. Typically, a 75 weight percent nitric acid solution is added at a rate of about 5 to about 6 weight percent based on the weight of alumina. The amount to be added is based on the quantity of foraminous carrier powder fed to the mixer rather than the pH of the mixture and, when a high energy mixer is used, addition of nitric acid may not be necessary. When circumstances call for its use as described, it has been found that the addition of the acid is beneficial to the formation of a desirable pore structure in the final catalyst. The mixture exiting from the mixer is fed to a device for shaping the mixture into the desired catalyst form. Preferably such shaping is accomplished in an extruder although other forming methods can be employed, e.g., based on compression.

This embodiment of the invention can be accomplished using a composition based on (I) above and further generally described as follows:

(II) A composition for use in preparing a catalytically active solid useful in chemically refining hydrocarbons, the composition comprising: (A) water in a quantity sufficient to provide a shaped foraminous catalyst mixture; (B) catalytically active metals useful in chemically refining hydrocarbons, the metals in the form of at least one component providing at least one metal from Group VIB of the periodic table and at least one component providing at least one metal from Group VIII of the periodic table, wherein the molar ratio of the Group VIII metal to Group VIB metal is about 0.05 to about 0.45, and wherein the Group VIII metal component is provided by a substantially water insoluble component; and (C) at least one water soluble phosphorous-containing acidic component in an amount sufficient to provide a phosphorous to Group VIB molar ratio of about 0.05 to less than about 0.25; and (D) at least one foraminous catalyst carrier. The compositional variations described above with regard to (I) apply, as well, to (II) and will not be repeated.

The method used to prepare the aqueous composition of (I) above is unique in that it results in a stable composition, as described, even though the amount of phosphorous-containing acidic component, e.g., phosphoric acid, is insufficient to effect dissolution of the substantially water insoluble Group VIII metal component when the two are combined. The method, representing another embodiment of the invention, can be generally described as follows:

(III) A method of preparing stabilized aqueous compositions for use in impregnating catalyst carriers to produce catalyst precursors and catalysts useful in chemically refining hydrocarbons, comprising adding to a suitable quantity of water: (A) at least one substantially water insoluble Group VIII metal component to produce a slurry; (B) at least one substantially water soluble, phosphorous-containing acidic component in an amount insufficient to cause dissolution of the Group VIII metal component so as to produce a slurry and combining the slurry with; (C) at least one Group VIB metal component; (D) mixing the combination of (A), (B) and (C) and, heating the mixture, for a time and to a temperature sufficient for (A), (B) and (C) to form a solution; and (E) adding an additional amount of water, if required, to obtain solution concentrations of the at least one Group VIII metal, the at least one Group VIB metal and phosphorous useful for impregnating the carriers; wherein Group VIB and Group VIII refer to Groups of the periodic table of the elements. Useful amounts, concentrations and ratios of the components are as further described in (I) above. Typically, mixing and heating is carried out over a period of about 0.5 to about 16 hours; preferably about 1 to about 8 hours; more preferably about 1 to about 4 hours; at a temperature typically about 150 to about 220° F.; preferably about 160 to about 200° F.; more preferably about 180 to about 190° F.

It can be seen that a catalyst prepared as described herein corresponds to a pre-impregnated catalyst as defined above. Although differences in the methods and compositions used to prepare such catalysts may be considered small compared to those described in the art, the catalyst resulting from these changes performs significantly better in hydrocarbon conversion processes than catalysts prepared according to prior art methods. Such advantages could not have been foreseen. Furthermore, the catalysts of the present invention are characterized by properties that similarly distinguish them from comparable catalysts prepared by standard methods. In particular, the catalysts are characterized by the Active Site Index, believed to correspond to the ratio of promoted to unpromoted Group VIB metal sites of the catalyst; in a preferred embodiment the Group VIB metal is molybdenum and the Group VIII metal is nickel or cobalt, more preferably nickel. The test method, based on the work by N.Y. Topsoe and H. Topsoe, J. Catalysis (1983), 84(2), 386-401, is as follows:

A sample of the catalyst is ground to −100 mesh, purged under vacuum overnight, then under nitrogen for one hour, and heated under 2 vol. % $H_2S$/98 vol. % $H_2$ for two hours at 150° C., two hours at 250° C. and three hours at 380° C., then nitrogen overnight at 380° C. The sample is cooled to room temperature, purged under vacuum for one hour and NO is flowed over the sample at room temperature for two hours. The sample is flushed with nitrogen for one hour, vacuum for one hour and nitrogen is introduced to fill the sample chamber. The sample chamber is sealed, then moved to an inert atmosphere glove box for infrared (IR) analysis. The Active Site Index (ASI) is calculated by dividing the height of the peak at about 1852 $cm^{-1}$ (believed to correspond to the promoted molybdenum sites) by the height of the peak at about 1716 $cm^{-1}$ (believed to correspond to the unpromoted molybdenum sites).

A catalyst can be prepared under controlled conditions in a laboratory in order to evaluate the effect of the impregnating solution preparation method, the catalyst impregnation method, as well as other catalyst preparation variables on ASI. In a standard procedure, a catalyst carrier is thoroughly mixed with water, or optionally with a dilute aqueous solution of nitric acid. The mixture is combined with a suitable quantity of a metals-impregnating solution or solutions containing at least one Group VIB and one Group VIII metal prepared according to the present invention in order to provide the desired level of the metals on the finished catalyst. Alternatively, for comparative purposes, the impregnating solution or solutions can be prepared according to standard methods and/or the impregnation can be carried out using a post-calcining procedure, as defined above. The metal-containing foraminous mixture is then shaped into catalyst agglomerate particles having a desired size, for example by extrusion.

The shaped catalyst particles are dried at a temperature of about 250° F. for at least four hours, and then calcined at a temperature of at least 1250° F. for at least one hour, such that the finished catalyst particles have less than about 1% total volatiles as measured at 1000° F. The catalyst can then be tested according to the ASI procedure described above.

The catalyst of the present invention is characterized by high values of ASI compared to typical pre-impregnated catalyst used in hydroconversion processes. Such prior art catalysts typically have ASI values less than about 0.7 whereas catalysts prepared according to the present invention have values that are greater than 0.7, typically greater than about 0.75 to about 2.0; generally at least about 0.80 to about 1.5; preferably about 0.85 to about 1.2; values greater than about 0.90 have been observed. Furthermore, the catalyst of the present invention has been examined in cross-section and the metals and phosphorous distribution across the particle has been measured and compared to a standard, commercial catalyst, e.g., corresponding to a catalyst of the type disclosed in U.S. Pat. No. 5,192,734. In a sample of the catalyst of the present invention based on molybdenum, nickel and phosphorous, the molybdenum and nickel distributions across the catalyst pellet tend to be more uniform than in a prior art catalyst; with the molybdenum concentration tending to be, perhaps, slightly greater at the center of the pellets. The improved ASI values may reflect the more uniform distribution of molybdenum and nickel.

(IV) A further embodiment of the invention comprises a pre-impregnated, calcined catalyst useful in chemically refining hydrocarbons, the catalyst comprising at least one catalytically active metal component from Group VIB of the periodic table, at least one catalytically active metal component from Group VIII of the periodic table, and a phosphorous component, wherein the metals and phosphorous are carried on a foraminous carrier, the pore mode is typically about 40 to about 90 Å, wherein the loss in weight on ignition (LOI) at 1000° F. to 1200° F. of said catalyst is less than about 5 wt. % based on the weight of the catalyst, and the ASI ratio is greater than about 0.75 to about 2.0.

In general, the catalyst carrier may be impregnated with the stable aqueous solutions containing the catalytically active components and the phosphorous component by alternative methods provided that a previously calcined catalyst carrier is not employed. In one method the catalyst carrier is slurried with the catalytically active aqueous solution and heated at around 180° F. for about 2 to about 3 hours. The impregnated, unshaped carrier is filtered, dried and the moisture adjusted to the proper degree. The filtered material is shaped, e.g., extruded, and then calcined. In a variation of this technique, the solution and carrier are contacted in the absence of heat, but a longer contact time is required to achieve suitable impregnation. In another method, the catalyst carrier to be impregnated is contacted with the stable solution for a sufficient time to uniformly fill the carrier pores. In this method enough catalytically active stable solution is added to obtain a uniform wetted or damp powder. After the requisite contact time wetted carrier composition is shaped, e.g., extruded, dried and then calcined. This is a particularly preferred method in that no filtering step or drying technique is needed after impregnation, since the appropriate moisture content for extrusion is obtained by the use of the catalytically active stable solution. Alternatively, the foraminous carrier is allowed to soak in the solution containing the catalytically active elements for a total of period of time, e.g., about 1 to about 24 hours, and the impregnated carrier is then separated from the solution by, e.g., filtration, dried and calcined.

As described above, after the impregnating solution and carrier, preferably alumina, are contacted and shaped, preferably by extrusion, the shaped particles are dried and then calcined. Therefore, the resulting catalyst particles prepared according to the methods of the present invention have preferably been calcined only once.

The catalysts prepared by the methods described herein have the following characteristics:

(a) Group VIB to Group VIII molar ratio typically about 20:1 to about 1:1; preferably about 5:1 to about 1:1; more preferably about 3:1 to about 1:1.

(b) Group VIB to Phosphorus molar ratio typically about 50:1 to about 2:1; preferably about 30:1 to about 4:1; more preferably about 25:1 to about 6:1.

(c) Group VIB metals level, expressed as the oxide (e.g., $MoO_3$), typically about 5.0 to about 25.0 wt. %; preferably about 7.0 to about 20.0 wt. %; more preferably about 10.0 to about 17.0 wt. %.

(d) Group VIII metals level, expressed as the oxide (e.g., NiO), typically about 0.5 to about 10.0 wt. %; preferably about 1.5 to about 8.0 wt. %; more preferably about 3.0 to about 6.0 wt. %;

(e) Phosphorus level, expressed as the oxide ($P_2O_5$), typically about 0.2 to about 2.0 wt. %; preferably about 0.2 to about 1.5 wt. %; more preferably about 0.2 to about 1.0 wt. %; and (f) Loss on ignition (LOI), measured at either 1000° F. or 1200° F. typically less than about 5 wt. %; preferably less than about 3 wt. %; more preferably less than about 2 wt. %.

Additionally, the physical characteristics of the finished catalyst include the following properties:
(a) surface area (SA) typically about 225 to about 500 m²/g; preferably about 250 to about 400 m²/g; more preferably about 250 to about 350 m²/g; most preferably about 250 m²/g to about 330 m²/g;
(b) total intrusion volume (TIV) is at least about 0.50 cc/g; preferably about 0.50 cc/g; more preferably about 0.7 to about 1.5 cc/g; and
(c) pore mode typically about 40 to about 90 Å; preferably about 45 to about 80 Å.

(V) Furthermore, the catalysts according to the invention are particularly useful in hydrocarbon conversion processes comprising contacting a hydrocarbon feedstock with a particulate catalyst under conditions of elevated temperature and elevated pressure with hydrogen, wherein the catalyst is made according to the present invention. As generally described, such catalysts comprise at least one catalytically active metal from Group VIB of the periodic table, at least one catalytically active metal from Group VIII of the periodic table, and phosphorous, wherein the metals and phosphorous are carried on a foraminous carrier, the pore mode is typically about 40 to about 90 Å, and wherein the ASI ratio is greater than about 0.75 to about 2.0.

Catalysts prepared according to the present invention can be used in virtually all hydroprocessing processes to treat a plurality of feeds under wide-ranging reaction conditions, generally, for example, at temperatures in the range of about 200° to about 500° C., hydrogen pressures in the range of about 5 to 300 bar, and liquid hourly space velocities (LHSV) in the range of about 0.05 to 10 h$^{-1}$. The term "hydroprocessing" can encompass various processes in which a hydrocarbon feed is reacted with hydrogen at elevated temperature and elevated pressure (hydroprocessing reaction conditions), including hydrogenation, hydrodesulfurization, hydrodenitrogenation, hydrodemetallization, hydrodearomatization, hydroisomerization, hydrodewaxing, hydrocracking, and hydrocracking under mild pressure conditions, which is also referred to as mild hydrocracking.

More specifically, "hydroprocessing" as the term is employed herein means oil refinery processes for reacting petroleum feedstocks (complex mixtures of hydrocarbon present in petroleum which are liquid at conditions of standard temperature and pressure) with hydrogen under pressure in the presence of a catalyst to lower: (a) the concentration of at least one of sulfur, contaminant metals, nitrogen, and Conradson carbon, present in said feedstock, and (b) at least one of the viscosity, pour point, and density of the feedstock. Hydroprocessing includes hydrocracking, isomerization/dewaxing, hydrofinishing, and hydrotreating processes which differ by the amount of hydrogen reacted and the nature of the petroleum feedstock treated.

Hydrofinishing is typically understood to involve the hydroprocessing of hydrocarbonaceous oil containing predominantly (by weight of) hydrocarbonaceous compounds in the lubricating oil boiling range ("feedstock") wherein the feedstock is contacted with solid supported catalyst at conditions of elevated pressure and temperature for the purpose of saturating aromatic and olefinic compounds and removing nitrogen, sulfur, and oxygen compounds present within the feedstock, and to improve the color, odor, thermal, oxidation, and UV stability, properties of the feedstock.

Hydrocracking is typically understood to involve the hydroprocessing of predominantly hydrocarbonaceous compounds containing at least five (5) carbon atoms per molecule ("feedstock") which is conducted: (a) at superatmospheric hydrogen partial pressure; (b) at temperatures typically below 593.3° C. (1100° F.); (c) with an overall net chemical consumption of hydrogen; (d) in the presence of a solid supported catalyst containing at least one (1) hydrogenation component; and (e) wherein said feedstock typically produces a yield greater than about one hundred and thirty (130) moles of hydrocarbons containing at least about three (3) carbon atoms per molecule for each one hundred (100) moles of feedstock containing at least five (5) carbon atoms per molecule.

Hydrotreating is typically understood to involve the hydroprocessing of predominantly hydrocarbonaceous compounds containing at least five carbon atoms per molecule ("feedstock") for the desulfurization and/or denitrification of said feedstock, wherein the process is conducted: (a) at superatmospheric hydrogen partial pressure; (b) at temperatures typically below 593.3° C. (1100° F.); (c) with an overall net chemical consumption of hydrogen; (d) in the presence of a solid supported catalyst containing at least one hydrogenation component; and (e) wherein: (i) the feedstock produces a yield of typically from about 100 to about 130 moles (inclusive) of hydrocarbons containing at least three carbon atoms per molecule for each 100 moles of the initial feedstock; or (ii) the feedstock comprises at least 50 liquid volume percent of undeasphalted residue typically boiling above about 565.6° C. (1050° F.) as determined by ASTM D-1160 Distillation and where the primary function of the hydroprocessing is to desulfurize said feedstock; or (iii) the feedstock is the product of a synthetic oil producing operation.

Isomerization/dewaxing is typically understood to involve hydroprocessing predominantly hydrocarbonaceous oil having a Viscosity Index (VI) and boiling range suitable for lubricating oil ("feedstock") wherein said feedstock is contacted with solid catalyst that contains, as an active component, microporous crystalline molecular sieve, at conditions of elevated pressure and temperature and in the presence of hydrogen, to make a product whose cold flow properties are substantially improved relative to said feedstock and whose boiling range is substantially within the boiling range of the feedstock.

A further embodiment of the present invention is directed to a process for the hydrotreating of a hydrocarbon feedstock in at least one ebullated bed reaction zone. More particularly, the hydrocarbon feedstock is contacted with hydrogen in one or a series of ebullated bed reaction zones in the presence of a hydroprocessing catalyst comprising a catalyst as described herein.

As is well known these feedstocks contain nickel, vanadium, and asphaltenes, e.g., about 40 ppm up to more than 1,000 ppm for the combined total amount of nickel and vanadium and up to about 25 wt. % asphaltenes. Further, the economics of these processes desirably produce lighter products as well as a demetallized residual by-product. This process is particularly useful in treating feedstocks with a substantial amount of metals containing 150 ppm or more of nickel and vanadium and having a sulfur content in the range of about 1 wt. % to about 10 wt. %. Typical feedstocks that can be treated satisfactorily by the process of the present invention contain a substantial amount (e.g., about 90%) of components that boil appreciably above 537.8° C. (1,000° F.). Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organometallic contaminants which create deleterious effects in various refining processes that employ catalysts in the conversion of the particular hydrocarbon stream being treated. The metallic contaminants that are found in such feedstocks include, but are not limited to, iron, vanadium, and nickel.

While metallic contaminants, such as vanadium, nickel, and iron, are often present in various hydrocarbon streams, other metals are also present in a particular hydrocarbon stream. Such metals exist as the oxides or sulfides of the particular metal, or as a soluble salt of the particular metal, or as high molecular weight organometallic compounds, including metal naphthenates and metal porphyrins, and derivatives thereof.

Another characteristic phenomenon of hydrotreating heavy hydrocarbons is the precipitation of insoluble carbonaceous substances from the asphaltenic fraction of the feedstock which cause operability problems. The amount of such sediment or insolubles formed increases with the amount of material boiling over 537.8° C. (1,000° F.) which is converted or with an increase in the reaction temperature employed. These insoluble substances, also known as Shell hot filtration solids, create the operability difficulties for the hydroconversion unit and thereby circumscribe the temperatures and feeds the unit can handle. In other words, the amount of solids formed limit the conversion of a given feedstock operability difficulties as described above may begin to manifest themselves at solids levels as low as 0.1 wt. %. Levels below 0.5 wt. % are generally desired to prevent fouling of process equipment. A description of the Shell hot filtration test is found at A. J. J., Journal of the Inst. of Petroleum (1951) 37, pp. 596-604 by Van Kerkvoort, W. J. and Nieuwstad, A. J. J. which is incorporated herein by reference.

Hydrotreating operations are typically carried out in one or a series of ebullated bed reactors. As previously elucidated, an ebullated bed is one in which the solid catalyst particles are kept in random motion by the upward flow of liquid and gas. An ebullated bed typically has a gross volume of at least 10 percent greater and up to 70% greater than the solids thereof in a settled state. The required ebullition of the catalyst particles is maintained by introducing the liquid feed, inclusive of recycle if any, to the reaction zone at linear velocities ranging from about 0.02 to about 0.4 feet per second and preferably, from about 0.05 to about 0.20 feet per second.

The operating conditions for the hydrotreating of heavy hydrocarbon streams, such as petroleum hydrocarbon residua and the like, are well known in the art and comprise a pressure within the range of about 1,000 psia (68 atm) to about 3,000 psia (204 atm), an average catalyst bed temperature within the range of about 700° F. (371° C.) to about 850° F. (454° C.), a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 2,000 standard cubic feet per barrel (SCFB) (356 m³/m³) to about 15,000 SCFB (2,671 m³/m³). Preferably, the operating conditions comprise a total pressure within the range of about 1,200 psia to about 2,000 psia (81-136 atm); an average catalyst bed temperature within the range of about 730° F. (387° C.) to about 820° F. (437° C.); and a LHSV within the range of about 0.1 to about 4.0; and a hydrogen recycle rate or hydrogen addition rate within the range of about 5,000 SCFB (890 m³/m³) to about 10,000 SCFB (1,781 m³/m³). Generally, the process temperatures and space velocities are selected so that at least 30 vol. % of the feed fraction boiling above 1,000° F. is converted to a product boiling below 1,000° F. and more preferably so that at least 70 vol. % of the subject fraction is converted to a product boiling below 1,000° F.

For the treatment of hydrocarbon distillates, the operating conditions would typically comprise a hydrogen partial pressure within the range of about 200 psia (13 atm) to about 3,000 psia (204 atm); an average catalyst bed temperature within the range of about 600° F. (315° C.) to about 800° F. (426° C.); a LHSV within the range of about 0.4 volume of hydrocarbon per hour per volume of catalyst to about 6 volumes of hydrocarbon recycle rate or hydrogen addition rate within the range of about 1,000 SCFB (178 m³/m³) to about 10,000 SCFB (1,381 m³/m³). Preferred operating conditions for the hydrotreating of hydrocarbon distillates comprise a hydrogen partial pressure within the range of about 200 psia (13 atm) to about 1,200 psia (81 atm); an average catalyst bed temperature within the range of about 600° F. (315° C.) to about 750° F. (398° C.); a LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 m³/m³) to about 6,000 SCFB (1,068 m³/m³).

The most desirable conditions for conversion of a specific feed to a predetermined product, however, can be best obtained by converting the feed at several different temperatures, pressures, space velocities and hydrogen addition rates, correlating the effect of each of these variables and selecting the best compromise of overall conversion and selectivity. The catalyst composition of the invention is particularly suitable for hydrotreating heavy hydrocarbon feedstocks.

All parts and percentages in the examples, as well as in the remainder of the specification, are by weight unless otherwise specified.

EXAMPLES

Stable Metals Solution and Catalyst Preparation Examples

Preparation of Impregnating Solution

Stable Metals Solution

Room temperature water (750 g) was placed in a glass kettle equipped with an overhead stirrer. Nickel carbonate (40% Ni; 116 g) was added to form a slurry. To the stirring slurry was added 75% orthophosphoric acid (52 g). The slurry was then heated to 120° F. Molybdenum trioxide (588 g) was added. After addition was complete, the temperature was raised to 190° F. and held for three hours. The solution was allowed to cool; the resulting solution corresponds to Example 1A. Subsequent dilution of 1 A with water to a final weight of 2280 g resulted in the solution of Example 1B. The theoretical concentration of metals for the diluted solution are 17.2% Mo, 2.0% Ni and 0.5% P. Analysis of the solution showed 17.0% Mo, 2.2% Ni and 0.5% P.

Properties of Alumina Carrier Used to Prepare Catalysts

| Alumina Properties For Catalyst Examples 1-3 | |
|---|---|
| Composition/Property | Alumina Carrier |
| Al$_2$O$_3$, wt. % | >99 |
| Na$_2$O, wt. % | 0.03 |
| SO$_4$, wt. % | 0.70 |
| Total Volatiles at 1750° F., wt. % | 34.2 |
| Average Particle Size, μm | 25 |

-continued

Alumina Properties For Catalyst Examples 1-3

| Composition/Property | Alumina Carrier |
|---|---|
| Surface Area, m$^2$/g | 303 |
| Pore Volume, cc/g | 0.93 |

Catalyst Example 1

Uncalcined pseudoboehmite alumina powder (5200 grams) was placed into a 5-gallon Baker Perkins Sigma mixer. Stable metals solution (2562 g), prepared according to the method described above, was added with mixing. Nickel nitrate solution (15% Ni; 798 g) and water (1584 g) were also added. The resulting material was mixed for 45 minutes. The metals-containing alumina mixture was extruded through a 4" Bonnot single auger type extruder. A die with nominal 1 mm holes was used to form the catalyst. The formed catalyst particles were dried at 250° F. for four hours then calcined at 1250° F. for one hour. The theoretical concentration of metals for this catalyst are 15.2% MoO$_3$, 5.0% NiO and 0.7% P$_2$O$_5$. Analysis of the catalyst showed 14.7% MoO$_3$, 4.9% NiO and 0.5% P$_2$O$_5$.

Catalyst Example 2

Uncalcined pseudoboehmite alumina powder (5200 grams) was placed into a 5-gallon Baker Perkins Sigma mixer. Stable metals solution (2515 g), prepared according to the method described above, was added with mixing. Nickel nitrate solution (15% Ni; 458 g) and water (1785 g) were also added. The resulting material was mixed for 45 minutes. The metals-containing alumina mixture was extruded through a 4" Bonnot single auger type extruder. A die with nominal 1 mm holes was used to form the catalyst. The formed catalyst particles were dried at 250° F. for four hours then calcined at 1250° F. for one hour. The theoretical concentration of metals for this catalyst are 15.2% MoO$_3$, 3.6% NiO and 0.7% P$_2$O$_5$. Analysis of the catalyst showed 14.7% MoO$_3$, 3.5% NiO and 0.7% P$_2$O$_5$.

Catalyst Example 3 (Comparative)

Uncalcined pseudoboehmite alumina powder (5200 grams) was placed into a 5-gallon Baker Perkins Sigma mixer. A dilute nitric acid solution prepared from 30 grams of 75% nitric acid and 1570 grams of water was added with mixing. After 15 minutes, an aqueous solution of ammonium dimolybdate (18.8% Mo; 2270 g) was added and the resulting mixture was mixed an additional 5 minutes. Nickel nitrate solution (15% Ni; 795 g) was added. The resulting material was mixed for 25 minutes. The metals-containing alumina mixture was extruded through a 4" Bonnot single auger type extruder. A die with nominal 1 mm holes was used to form the catalyst. The formed catalyst particles were dried at 250° F. for four hours then calcined at 1250° F. for one hour. The theoretical concentration of metals for this catalyst are 15.3% MoO$_3$ and 3.6% NiO. Analysis of the catalyst showed 14.7% MoO$_3$ and 3.5% NiO. The catalyst had the following properties: Surface area (m$^2$/g)=334; Total pore volume (cc/g)=0.83; Pore volume>250 Å (cc/g)=0.24. The catalyst was prepared as for Example 2 except using separate solutions of ammonium dimolybdate and nickel nitrate were used and no phosphoric acid was used.

ASI Properties of Catalysts

The catalyst samples prepared as described above were tested for ASI using the method described above; the results are shown in the following table:

| Sample | ASI |
|---|---|
| Catalyst Example 1 | 0.94 |
| Catalyst Example 2 | 0.76 |
| Catalyst Example 3 (Comparative) | 0.62 |

The results clearly show the advantage of the stable impregnating solution and the pre-impregnation method used to prepare the catalysts.

The catalyst samples for the pilot plant tests had the properties shown in the following table:

|  | Invention Example 1 | Invention Example 2 | Comparative Pilot Plant Sample |
|---|---|---|---|
| MoO$_3$ (wt. %) | 14.7 | 14.7 | 14.4 |
| NiO (wt. %) | 4.9 | 3.5 | 3.3 |
| Ni/Mo (mol/mol) | 0.64 | 0.46 | 0.44 |
| P$_2$O$_5$ (wt. %) | 0.5 | 0.7 | 0.0 |
| Surface Area (m$^2$/g) | 322 | 301 | 345 |
| Total Pore Volume (cc/g) | 0.79 | 0.83 | 0.82 |
| Pore Vol. >250 Å (cc/g) | 0.22 | 0.24 | 0.24 |

Preparation of the Comparative Pilot Plant Catalyst is as Follows:

A mixture is prepared using a quantity of an aqueous solution of ammonium dimolybdate, an aqueous solution of nickel nitrate, water, nitric acid, recycled fines and uncalcined pseudoboehmite alumina powder. The components are fed to a mixer to combine these components in order to form a homogeneous "damp mix" suitable for extrusion. The extruded particles are dried at a temperature of about 110 to about 150° C., and then calcined at a temperature of about 500 to about 750° C. for about one to about two hours.

Evaluation of Catalyst Performance

The properties of the hydrocarbon feedstock used in the pilot plant catalyst evaluation are shown in the following table.

Hydrocarbon Feedstock Properties

| Type | Arab Medium Vacuum Resid |
|---|---|
| API Gravity | 7.2 |
| 1000 deg F.+, wt. % | 77.6 |
| Sulfur, wt. % | 4.86 |
| Total Nitrogen, wppm | 3428 |
| MCR, wt. % | 16.9 |
| Pentane Insolubles, wt. % | 12.8 |
| Heptane Insolubles, wt. % | 6.1 |
| Metals, wppm |  |
| Ni | 33.9 |
| V | 112.5 |
| Na | <1 |
| D1160, vol % (deg F.) |  |
| IBP | 738 |
| 5% | 853 |
| 10% | 910 |

-continued

Hydrocarbon Feedstock Properties

| Type | Arab Medium Vacuum Resid |
|---|---|
| 20% | 989 |
| 30% | 1039 |
| 40% | 1082 |
| 50% | 1092 |

Catalyst performance was evaluated in a fixed bed pilot plant using the following operating conditions:
1. 100 cc of catalyst is charged to the reactor. (Reactor is 1 in. diameter, 3 ft long, with 6 individual band heaters controlled by 6 thermocouples spaced along the reactor bed).
2. The catalyst is heated to 350° F. in nitrogen and then hydrogen at 300 psig and at 6.5 SCF/hr for leak test and catalyst dryout.
3. The reactor temperature is raised to 450° F. (at 25 F/hr rate) with $H_2$ rate at 6.5 SCF/hr and 1 wt % DMDS in heptane (sulfiding solution) at 145 cc/hr to start sulfiding. After 18 hours, temperature is raised to 650° F. (at 25 F/hr rate) and 6 wt % DMDS in heptane is used at 145 cc/hr for 10 hours. Sulfiding is essentially complete after this step.
4. The unit is pressured with $H_2$ to 2000 psig. The $H_2$ flow rate is set at 5000 SCF/bbl of feedstock when operating at a Liquid Hourly Space Velocity (LHSV) of 0.97.
5. The catalyst bed temperature is raised to 680° F. (at 50 F/hr) with the feedstock which is then introduced at 0.97 LHSV.
6. After 24 hours on feedstock, the temperature is raised to the desired operating temperature (795-805° F.).
7. The liquid product is collected daily and analyzed for API, sulfur, MCR, nitrogen, metals, 1000 F+ and sediment.

MCR=micro carbon residue and is described in ASTM Method D4530. Sediment, test method ASTM D4870; a reference to this test appears in U.S. Pat. No. 5,928,499 (Column 13, lines 31-42). In the figure illustrating sediment vs. conversion, FIG. 3, the dotted line separates data collected at 795° F. (left) from data collected at 805° F. (right). As for sediment, sediment is the insoluble material (captured by filtration) that is found in the feed or product. This is to be contrasted with carbon residue which is the material left after pyrolyzing the feed or product. The sediment level for the resid feedstocks typically is very low. There are both sediment molecules and sediment precursor molecules in the feed, but the sediment molecules are soluble in the feed and therefore are not captured via filtration. Upon conversion of the 1000° F.+ materials, the sediment precursor molecules become sediment molecules, and it is believed that the solubility properties of the product are diminished compared to the feed. Therefore, more severe operations lead to higher observed sediment. Less sediment is observed with better performing catalysts and this is believed due to either production of less sediment molecules or conversion of the feed in such a way that the products have better solubility properties, or both.

Percent conversion for all parameters is calculated using the following equation:

[(amount X in feed−amount X in product)/amount X in feed]*100

For example, for 1000° F.+ conversion, it would be the volume of 1000° F.+ boiling material in the feed (for a certain period of time corresponding to the balance period being considered for the pilot plant) minus the volume of 1000° F.+ boiling material in the product (over that same period of time), this quantity divided by the volume of 1000° F.+ boiling material in the feed, all times 100. The same calculation procedure is used for sulfur and MCR.

Performance of the catalysts is shown in FIGS. 1, 2 and 3. In each instance it can be seen that the catalyst examples of the invention performed better than the comparative catalyst: improved sulfur conversion, particularly at extended run length; improved microcarbon residue conversion; and reduced sediment versus 1000° F.+ conversion. Typical results at equivalent conversion were as follows:

| Catalyst | HDS Conversion (%)* | 1000° F.+ Conversion (%) | Sediment (ppmw) |
|---|---|---|---|
| Ex. 1 | 85 | 59 | 3000 |
| Ex. 2 | 83 | 61 | 4000 |
| Comparative | 79 | 60 | 6000 |

*at approximately 180 hrs. on feed (FIG. 2)

Any range of numbers recited in the specification, or paragraphs hereinafter, describing various aspects of the invention, such as that representing a particular set of properties, units of measure, conditions, physical states or percentages, is intended literally to incorporate expressly herein by reference or otherwise, any number falling within such range, including any subset of numbers or ranges subsumed within any range so recited. Additionally, the term "about" when used as a modifier for, or in conjunction with, a variable, is intended to convey that the values and ranges disclosed herein are flexible and that practice of the present invention by those skilled in the art using, e.g., temperatures, concentrations, amounts, contents, carbon numbers, properties such as viscosity, particle size, surface area, solubility, etc., that are outside of the stated range or different from a single value, will achieve the desired result, namely, preparation of aqueous compositions useful for impregnating foraminous carriers, methods of impregnating such carriers, the catalysts obtained thereby and the use of such catalysts in hydroconversion processes.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art, without departing from the spirit of the invention.

The invention claimed is:

1. A catalyst prepared by impregnation of a catalyst carrier with a stabilized aqueous composition according to use of any one of the methods set forth in the following enumerated Paragraphs 1 through 15 and including the step of separating the volatile portion of said solution from the impregnated uncalcined carrier to obtain a dried catalyst having a desired moisture content:

Paragraph 1: A method of preparing stabilized aqueous compositions for use in impregnating catalyst carriers to produce catalyst precursors and catalysts, comprising adding to a suitable quantity of water:
(A) at least one substantially water insoluble Group VIII metal component; and
(B) at least one substantially water-soluble, phosphorous-containing acidic component in an amount insufficient to cause dissolution of said Group VIII metal component so as to produce a slurry, and combining said slurry with:
(C) at least one Group VIB metal component; and (D) mixing the combination of (A), (B) and (C) and heating the mixture, for a time and to a temperature sufficient for (A), (B) and (C) to form a solution; and (E) adding an additional amount of water, if required, to obtain solution concentrations of said at least one Group VIII metal, said at least one Group VIB metal and phosphorous useful for impregnating said carriers;

wherein Group VIB and Group VIII refer to Groups of the periodic table of the elements;

Paragraph 2: The method according to Paragraph 1 wherein the amount of said phosphorous-containing acidic component provides a phosphorous to Group VIB metal molar ratio of about 0.05 to less than about 0.25;

Paragraph 3: The method according to Paragraph 1 wherein said molar ratio of Group VIII metal to Group VIB metal is about 0.05 to about 0.45;

Paragraph 4: The method according to Paragraph 1 wherein the concentration of said Group VIB metal is about 3 to about 50 weight percent;

Paragraph 5: The method according to Paragraph 1 wherein said Group VIII metal component is selected from the group consisting of nickel carbonate and cobalt carbonate;

Paragraph 6: The method according to Paragraph 1 further comprising adding an element from Group VIII in the form of a substantially water-soluble component to provide a molar ratio of total Group VIII metal to Group VIB metal of about 0.05 to about 1.0;

Paragraph 7: The method according to Paragraph 6 wherein said Group VIII metal component is nickel nitrate;

Paragraph 8: The method according to Paragraph 1 or

Paragraph 12 wherein said acidic component is orthophosphoric acid;

Paragraph 9: The method according to Paragraph 1 or Paragraph 14 wherein said Group VIB metal is selected from molybdenum or tungsten;

Paragraph 10: The method according to Paragraph 9 wherein said acidic component is orthophosphoric acid;

Paragraph 11: The method according to Paragraph 9 wherein said Group VIB metal is molybdenum;

Paragraph 12: The method according to Paragraph 1 wherein the amount of said phosphorous-containing acidic component provides a phosphorous to Group VIB metal molar ratio of about 0.09 to about 0.18;

Paragraph 13: The method according to Paragraph 1 wherein said molar ratio of Group VIII metal to Group VIB metal is about 0.10 to about 0.25;

Paragraph 14: The method according to Paragraph 1 wherein the concentration of said Group VIB metal is about 3.5 to about 42 weight percent;

Paragraph 15: The method according to Paragraph 1 further comprising adding an element from Group VIII in the form of a substantially water-soluble component to provide a molar ratio of total Group VIII metal to Group VIB metal of about 0.30 to about 0.9.

2. The catalyst according to claim 1 wherein said carrier is selected from the group consisting of alumina, silica, silica-alumina, natural clay, synthetic clay and mixtures thereof.

3. The catalyst according to claim 2 wherein said carrier is alumina.

4. The catalyst according to claim 1 and further including the step of forming or shaping the impregnated catalyst carrier.

5. The catalyst according to any one of claims 1 to 4 further including the step of calcining the dried catalyst.

6. The catalyst according to any one of claims 1 to 4, having been calcined and dried, useful in hydroprocessing a petroleum feed, said catalyst comprising at least one catalytically active metal from Group VIB of the periodic table, at least one catalytically active metal from Group VIII of the periodic table, and phosphorous, wherein said metals and phosphorous are carried on a foraminous carrier, wherein the pore mode is about 40 to about 90Å, wherein the loss in weight on ignition at 1000° F. to 1200° F. of said catalyst is less than about 5 wt.% based on the weight of the catalyst, and wherein the ASI ratio is greater than about 0.75 to about 2.0.

7. The catalyst according to any one of claims 1 to 4, having been calcined and dried, useful in hydrodesulfurization, hydrodenitrification and hydrodemetallation of heavy hydrocarbons, said catalyst comprising at least one catalytically active metal from Group VIB of the periodic table, at least one catalytically active metal from Group VIII of the periodic table, and phosphorous, wherein said metals and phosphorous are carried on a foraminous carrier, wherein the pore mode is about 40 to about 90Å, wherein the loss in weight on ignition at 1000° F. to 1200° F. of said catalyst is less than about 5 wt.% based on the weight of the catalyst and wherein the ASI ratio is greater than about 0.75 to about 2.0.

8. The catalyst according to any one of claims 1 to 4, having been calcined and dried, characterized by its ability to hydrotreat a charge hydrocarbon feed containing components boiling above 1000° F, and sediment-formers, sulfur compounds, metals, asphaltenes, carbon residue, and nitrogen compounds, said catalyst comprising at least one catalytically active metal from Group VIB of the periodic table, at least one catalytically active metal from Group VIII of the periodic table, and phosphorous, wherein said metals and phosphorous are carried on a foraminous carrier, wherein the pore mode is about 40 to about 90 Å wherein the loss in weight on ignition at 1000° F. to 1200° F. of said catalyst is less than about 5 wt.% based on the weight of the catalyst and wherein the AST ratio is greater than about 0.75 to about 2.0.

9. A catalyst prepared by impregnation of a catalyst carrier with a stabilized aqueous composition according to use of any one of the compositions set forth in the following enumerated Paragraphs 1 through 14 and including the step of separating the volatile portion of said solution from the impregnated uncalcined carrier to obtain a dried catalyst having a desired moisture content:

Paragraph 1: A stabilized composition for use in impregnating catalyst carriers comprising:

(A) water;

(B) catalytically active metals being in the form of and comprising:

(1) at least one component providing at least one metal from Group VIB of the periodic table; and (2) at least one component providing at least one metal from Group VIII of the periodic table; wherein (i) said Group VIII metal is provided by a substantially water insoluble component;

(ii) the molar-ratio of said Group VIII metal to Group VIB metal is about 0.05 to about 0.45, provided that the amount of said Group VIII metal is sufficient to promote the catalytic effect of said Group VIB metal;

(iii) the concentration of said Group VIB metal, expressed as the oxide, is at least about 3 to about 50 weight percent based on the weight of said composition; and (C) at least one substantially water-soluble, phosphorous-containing acidic component in an amount insufficient to solubilize said Group VIII metal at ambient temperature and sufficient to provide a phosphorous to Group VIB metal molar ratio of about 0.05 to less than about 0.25;

Paragraph 2: A composition according to Paragraph 1 wherein said molar ratio of Group VIII metal to Group VIB metal is about 0.05 to about 0.40;

Paragraph 3: A composition according to Paragraph 1 wherein the concentration of said Group VIB metal is about 3 to about 50 weight percent;

Paragraph 4: A composition according to Paragraph 1 wherein said molar ratio of phosphorous to Group VIB metal is about 0.07 to about 0.23;

Paragraph 5: A composition according to any one of Paragraphs 1 to 4 wherein said Group VIII component is selected from the group consisting of a nickel carbonate and cobalt carbonate;

Paragraph 6: A composition according to Paragraph 1 further comprising an additional amount of an element from Group VIII in the form of a substantially water-soluble component to provide a molar ratio of total Group VIII metal to Group VIB metal of about 0.05 to about 1.0;

Paragraph 7: A composition according to Paragraph 2 wherein said component of a Group VIII metal is nickel carbonate;

Paragraph 8: A composition according to Paragraph 6 wherein said substantially water-soluble component is nickel nitrate;

Paragraph 9: A composition according to Paragraph 1 wherein said acidic component is orthophosphoric acid;

Paragraph 10: A composition according to any of Paragraphs 1 through 4, 6 and 7 wherein said Group VIB metal is selected from molybdenum or tungsten;

Paragraph 11: A composition according to Paragraph 1 wherein said molar ratio of Group VIII metal to Group VIB metal is about 0.10 to about 0.25;

Paragraph 12: A composition according to Paragraph 1 wherein the concentration of said Group VIB metal is about 3.5 to about 42 weight percent;

Paragraph 13: A composition according to Paragraph 1 wherein said molar ratio of phosphorous to Group VIB metal is about 0.09 to about 0.18;

Paragraph 14: A composition according to Paragraph 1 further comprising an additional amount of an element from Group VIII in the form of a substantially water-soluble component to provide a molar ratio of total Group VIII metal to Group VIB metal of about 0.30 to about 0.9.

10. The catalyst according to claim 9 wherein said carrier is selected from the group consisting of alumina, silica, silica-alumina, natural clay, synthetic clay and mixtures thereof.

11. The catalyst according to claim 10 wherein said carrier is alumina.

12. The catalyst according to claim 9 and further including the step of forming or shaping the impregnated catalyst carrier.

13. The catalyst according to any one of claims 9 to 12 and further including the step of calcining the dried catalyst.

14. The catalyst according to any one of claims 9 to 12, having been calcined and dried, useful in hydroprocessing a petroleum feed, said catalyst comprising at least one catalytically active metal from Group VIB of the periodic table, at least one catalytically active metal from Group VIII of the periodic table, and phosphorous, wherein said metals and phosphorous are carried on a foraminous carrier, wherein the pore mode is about 40 to about 90Å, wherein the loss in weight on ignition at 1000° F. to 1200° F. of said catalyst is less than about 5 wt.% based on the weight of the catalyst, and wherein the ASI ratio is greater than about 0.75 to about 2.0.

15. The catalyst according to any one of claims 9 to 12, having been calcined and dried, useful in hydrodesulfurization, hydrodenitrification and hydrodemetallation of heavy hydrocarbons, said catalyst comprising at least one catalytically active metal from Group VIB of the periodic table, at least one catalytically active metal from Group VIII of the periodic table, and phosphorous, wherein said metals and phosphorous are carried on a foraminous carrier, wherein the pore mode is about 40 to about 90Å, wherein the loss in weight on ignition at 1000° F. to 1200° F. of said catalyst is less than about 5 wt.% based on the weight of the catalyst and wherein the ASI ratio is greater than about 0.75 to about 2.0.

16. The catalyst according to any one of claims 9 to 12, having been calcined and dried, characterized by its ability to hydrotreat a charge hydrocarbon feed containing components boiling above 1000° F., and sediment-formers, sulfur compounds, metals, asphaltenes, carbon residue, and nitrogen compounds, said catalyst comprising at least one catalytically active metal from Group VIB of the periodic table, at least one catalytically active metal from Group VIII of the periodic table, and phosphorous, wherein said metals and phosphorous are carried on a toraminous carrier, wherein the pore mode is about 40 to about 90Å wherein the loss in weight on ignition at 1000° F. to 1200° F. of said catalyst is less than about 5 wt.% based on the weight of the catalyst and wherein the ASI ratio is greater than about 0.75 to about 2.0.

* * * * *